United States Patent
Izutsu et al.

(10) Patent No.: US 10,633,035 B2
(45) Date of Patent: Apr. 28, 2020

(54) VEHICLE BODY STRUCTURE

(71) Applicant: HONDA MOTOR CO., LTD., Tokyo (JP)

(72) Inventors: Masaki Izutsu, Wako (JP); Yoichiro Hamano, Wako (JP); Tokihisa Ueta, Wako (JP); Tomohiro Yoshimura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/124,628

(22) Filed: Sep. 7, 2018

(65) Prior Publication Data

US 2019/0077464 A1 Mar. 14, 2019

(30) Foreign Application Priority Data

Sep. 8, 2017 (JP) .................. 2017-173297

(51) Int. Cl.
*B62D 25/20* (2006.01)
*B62D 25/14* (2006.01)
*B62D 27/02* (2006.01)

(52) U.S. Cl.
CPC ......... *B62D 25/2018* (2013.01); *B62D 25/14* (2013.01); *B62D 25/145* (2013.01); *B62D 27/02* (2013.01)

(58) Field of Classification Search
CPC ...... B62D 25/14; B62D 25/145; B62D 25/20; B62D 25/2009; B62D 25/2018; B62D 27/02
USPC ................. 296/29, 187.08, 193.07
See application file for complete search history.

(56) References Cited

U.S. PATENT DOCUMENTS

| | | | |
|---|---|---|---|
| 9,896,131 B2* | 2/2018 | Onishi | B62D 21/157 |
| 2015/0008703 A1* | 1/2015 | Furusaki | B62D 21/152 |
| | | | 296/187.08 |
| 2016/0052561 A1* | 2/2016 | Atsumi | B62D 25/2045 |
| | | | 296/187.08 |
| 2016/0272253 A1* | 9/2016 | Yoshida | B62D 25/14 |
| 2017/0113729 A1* | 4/2017 | Onishi | B62D 21/157 |
| 2018/0065676 A1 | 3/2018 | Yoshida et al. | |
| 2019/0016394 A1* | 1/2019 | Han | B62D 27/02 |

FOREIGN PATENT DOCUMENTS

WO 2016/148057 A1 9/2016

* cited by examiner

*Primary Examiner* — Jason S Daniels
(74) *Attorney, Agent, or Firm* — Rankin, Hill & Clark LLP

(57) ABSTRACT

A vehicle body structure has: a dash cross member on a front wall section of a vehicle interior, and forming a closed cross section extending in a vehicle width direction; a floor tunnel on a vehicle-widthwise center section of the vehicle interior, formed in a groove shape opened to a lower side, and extending in a front-rear direction; a corner patch on a vehicle exterior side of the floor tunnel and extending along a ridge portion of the floor tunnel in the front-rear direction; and a first joint at which front end sides of the dash cross member and the corner patch are joined together. The dash cross member is provided on the vehicle interior side of the floor tunnel so as to range continuously from the floor tunnel to both vehicle-widthwise sides, and the floor tunnel includes a front extension portion extending frontward beyond the first joint.

7 Claims, 8 Drawing Sheets

VEHICLE BODY STRUCTURE

CROSS REFERENCE TO RELATED APPLICATION

This application claims the priority of Japanese Patent Application No. 2017-173297, filed on Sep. 8, 2017, the entire specification, claims and drawings of which are incorporated herewith by reference.

BACKGROUND OF THE INVENTION

1. Field of the Invention

The present invention relates to a vehicle body structure.

2. Description of the Related Art

For example, International Publication No. WO2016/148057 discloses a vehicle body structure including a dash cross member provided on a dash lower panel and extending in a vehicle width direction, and a floor tunnel provided on a vehicle-widthwise center portion of a vehicle interior and extending in a front-rear direction. The dash cross member in International Publication No. WO2016/148057 includes panel closed-cross-section forming members which form closed cross sections in collaboration with the dash lower panel on both vehicle-widthwise sides of the floor tunnel, and a tunnel closed-cross-section forming member which forms a closed cross section in collaboration with the floor tunnel. Thus, the dash cross member constitutes the closed cross sections extending in the vehicle width direction.

The panel closed-cross-section forming member in the related art is provided on the vehicle interior side of the dash lower panel, whereas the tunnel closed-cross-section forming member is provided on the side of the floor tunnel opposite from the vehicle interior. Thus, the panel closed cross section and the tunnel closed cross section are not directly connected to each other. For this reason, the closed cross sections formed by the dash cross member have no continuity across the floor tunnel.

SUMMARY OF THE INVENTION

The present invention was made in view of the above point, and has an object to provide a vehicle body structure that ensures the continuity of a closed cross section formed by a dash cross member.

In order to achieve the above object, a vehicle body structure according to the present invention includes: a dash cross member provided on a front wall section of a vehicle interior, and forming a closed cross section extending in a vehicle width direction; a floor tunnel provided on a vehicle-widthwise center section of the vehicle interior, formed in a groove shape opened to a lower side, and extending in a front-rear direction; a corner patch provided on a vehicle exterior side of the floor tunnel and extending along a ridge portion of the floor tunnel in the front-rear direction; and a first joint at which front end sides of the dash cross member and the corner patch are joined together. The dash cross member is provided on the vehicle interior side of the floor tunnel so as to range continuously from the floor tunnel to both vehicle-widthwise sides. The floor tunnel includes a front extension portion extending frontward beyond the first joint.

With the vehicle body structure according to the present invention, it is possible to ensure the continuity of a closed cross section formed by a dash cross member.

DETAILED DESCRIPTION OF THE EMBODIMENTS

Embodiments of the present invention are described in details with reference to the drawings as needed. The same constituent elements are assigned with the same reference signs and the redundant description thereof is omitted. Directions described herein mean the front, rear, left, right, upper, and lower directions viewed from a driver. In this regard, a "vehicle width direction (vehicle-widthwise)" has the same meaning as the "left-right direction (transverse)".

Figure 1:
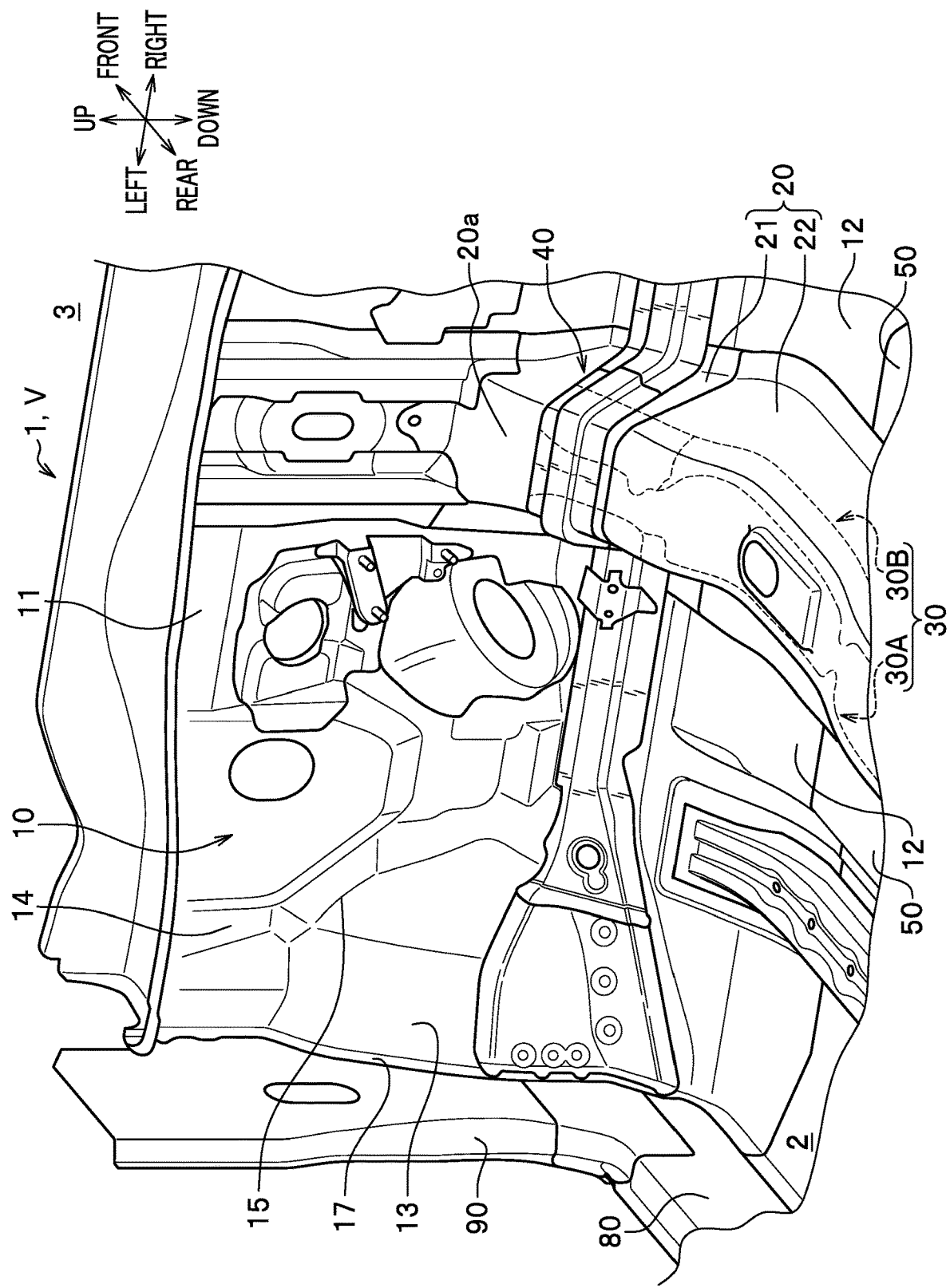
FIG. 1 is a perspective view of a vehicle body structure according to an embodiment of the present invention seen downward from the right rear side.

As illustrated in FIG. 1, a motor vehicle V having a vehicle body structure 1 according to an embodiment includes a dash lower panel 10, a floor tunnel 20, corner patches 30, and a dash cross member 40.

The dash lower panel 10 is a member constituting a front wall section of a vehicle interior 2. Specifically, the dash lower panel 10 is a plate-shaped member by which a power source device chamber 3 on the front side and the vehicle interior 2 on the rear side are partitioned. The dash lower panel 10 is formed, for example, by bending a steel plate into a predetermined shape by press molding. The dash lower panel 10 includes a vertical wall 11 extending in the vertical direction and in the vehicle width direction, inclined walls 12 extending from a lower end of the vertical wall 11 while inclining downward toward the rear, a pair of wheel arch forming portions 13 formed at both vehicle-widthwise ends of the dash lower panel 10 (only the left wheel arch forming portion 13 is illustrated in FIG. 1). In the following description, the portions of the dash lower panel other than the wheel arch forming portions 13 are collectively referred to as an "ordinary portion 14" in some cases.

The dash lower panel 10 includes a dash flange portion 17 extending rearward from each vehicle-widthwise outer end of the dash lower panel 10. The dash flange portion 17 is formed over the vertical wall 11, the wheel arch forming portion 13, and the inclined wall 12. A side sill 80 and a front pillar lower 90 are joined to the dash flange portion 17. A floor panel 50 is joined to lower ends of the inclined walls 12. The floor panel 50 extends from the lower ends of the inclined walls 12 rearward approximately horizontally. Here, the floor panel 50 corresponds to a "front-rear wall" in Claims.

Figure 2:
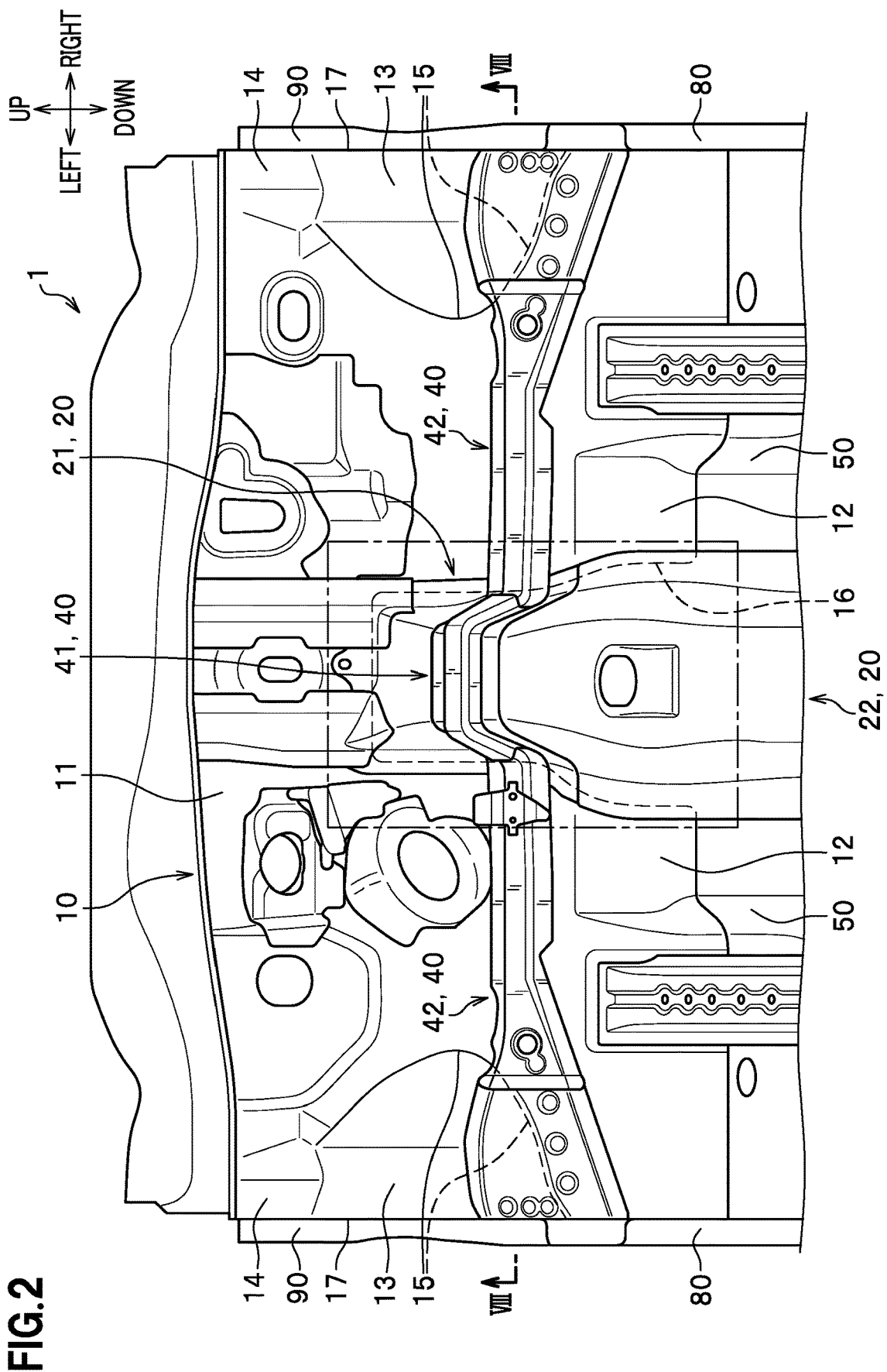
FIG. 2 is a rear side view of the vehicle body structure seen from the rear side.

Each wheel arch forming portion 13 is a portion constituting a part of a wheel arch (not illustrated) that covers an upper half of a front wheel of the motor vehicle V. The wheel arch forming portion 13 is formed in a spherical shape bulging on the vehicle interior 2 side and ranges from the vertical wall 11 to the inclined wall 12. As illustrated in FIG. 2, a ridge portion 15 that is a boundary between the wheel arch forming portion 13 and the ordinary portion 14 (mainly the vertical wall 11) includes a bent line (ridge line) formed by bending the dash lower panel 10 and is provided to extend along an approximately arc shape in a rear side view. The dash lower panel 10 includes a cutout portion 16 at a vehicle-widthwise center portion thereof. The cutout portion 16 is formed in a recessed shape opened to the lower side, and ranges along the vertical wall 11 and the inclined walls 12.

The floor tunnel 20 is a member formed separately from the dash lower panel 10, and provided at the vehicle-widthwise center portion of the vehicle interior 2. The floor tunnel 20 is joined to the vehicle-widthwise center portion (the cutout portion 16) of the dash lower panel 10. The floor tunnel 20 is a member formed by bending in a groove shape opened to the lower side and protruding upward (in a tunnel shape or an inverted-U shape), and is provided to extend in the front-rear direction. The floor tunnel 20 extends continuously from the vertical wall 11 through the inclined walls 12 to the floor panel 50 serving as the front-rear wall. A propeller shaft, an exhaust pipe, and the like not illustrated are housed inside (below) the floor tunnel 20. The floor tunnel 20 includes two members named a front floor tunnel 21 arranged on the front side and a rear floor tunnel 22 arranged in the rear of the front floor tunnel 21.

Figure 4:
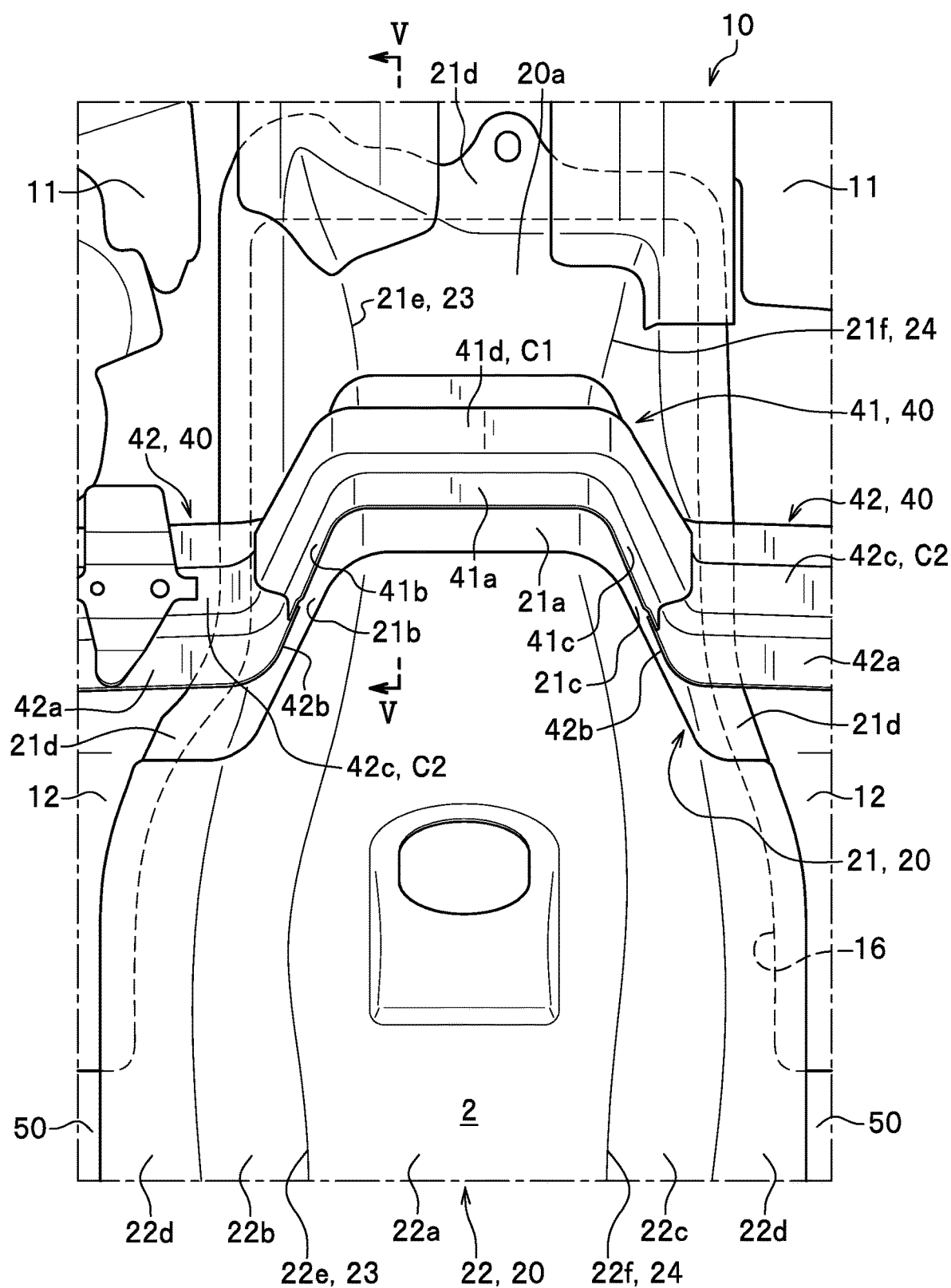
FIG. 4 is an enlarged rear side view of a part of FIG. 2.

As illustrated in FIG. 4, the front floor tunnel 21 is a member formed by, for example, bending a steel plate by press molding into a groove shape opened to the lower side. The front floor tunnel 21 includes a front tunnel upper wall portion 21a constituting an upper wall, a front tunnel left wall portion 21b and a front tunnel right wall portion 21c constituting side walls by respectively extending downward from left and right ends of the front tunnel upper wall portion 21a, and a front tunnel flange portion 21d formed by bending at a front end and lower ends of these front wall and side walls.

The front tunnel upper wall portion 21a is inclined to extend upward toward the front. In the present embodiment, the front tunnel left wall portion 21b and the front tunnel right wall portion 21c are formed to be flat. The front tunnel flange portion 21d is joined to a peripheral edge of the cutout portion 16. A front tunnel left ridge portion 21e, which is a left ridge line, is formed of a bent portion at which the front tunnel upper wall portion 21a is continued to the front tunnel left wall portion 21b, and extends in the front-rear direction. Moreover, a front tunnel right ridge portion 21f, which is a right ridge line, is formed of a bent portion at which the front tunnel upper wall portion 21a is continued to the front tunnel right wall portion 21c, and extends in the front-rear direction.

The rear floor tunnel 22 is a member constituting a main body of the floor tunnel 20. The rear floor tunnel 22 is a member formed by, for example, bending a steel plate by press molding into a groove shape opened to the lower side, and extends approximately horizontally. The rear floor tunnel 22 includes a rear tunnel upper wall portion 22a constituting an upper wall, a rear tunnel left wall portion 22b and a rear tunnel right wall portion 22c constituting side walls by respectively extending downward from left and right ends of the rear tunnel upper wall portion 22a, and a rear tunnel flange portion 22d formed by bending at lower ends of the side walls.

A front end side of the rear tunnel upper wall portion 22a is inclined to extend upward toward the front. In the present embodiment, the rear tunnel left wall portion 22b and the rear tunnel right wall portion 22c are formed to be flat. The rear tunnel flange portion 22d is joined to the peripheral edge of the cutout portion 16 and vehicle-widthwise inner ends of the floor panel 50. A rear tunnel left ridge portion 22e, which is a left ridge line, is formed of a bent portion at which the rear tunnel upper wall portion 22a is continued to the rear tunnel left wall portion 22b, and extends in the front-rear direction. Moreover, a rear tunnel right ridge portion 22f, which is a right ridge line, is formed of a bent portion at which the rear tunnel upper wall portion 22a is continued to the rear tunnel right wall portion 22c, and extends in the front-rear direction. In the following description, the front tunnel left ridge portion 21e and the rear tunnel left ridge portion 22e are collectively referred to as a "tunnel left ridge portion 23", and the front tunnel right ridge portion 21f and the rear tunnel right ridge portion 22f are collectively referred to as a "tunnel right ridge portion 24" in some cases.

The front floor tunnel 21 is formed to have a lower compressive strength to collision load from front than the rear floor tunnel 22 by means of, for example, selection of material, plate thickness, reinforcement structure, through holes, and the like. As an example, it is possible to form the front floor tunnel 21 of a single general steel plate, and to form the rear floor tunnel 22 of a high tensile steel plate, so that the higher and lower compressive strengths may be imparted to the two floor tunnels, respectively.

The front floor tunnel 21 is formed to have a lower strength to collision load from front than the dash lower panel 10 by means of, for example, selection of material, plate thickness, reinforcement structure, through holes, and the like. Upon collision of the vehicle, the front floor tunnel 21 absorbs the collision energy by collapsing in the front-rear direction due to the collision load.

Figure 5:
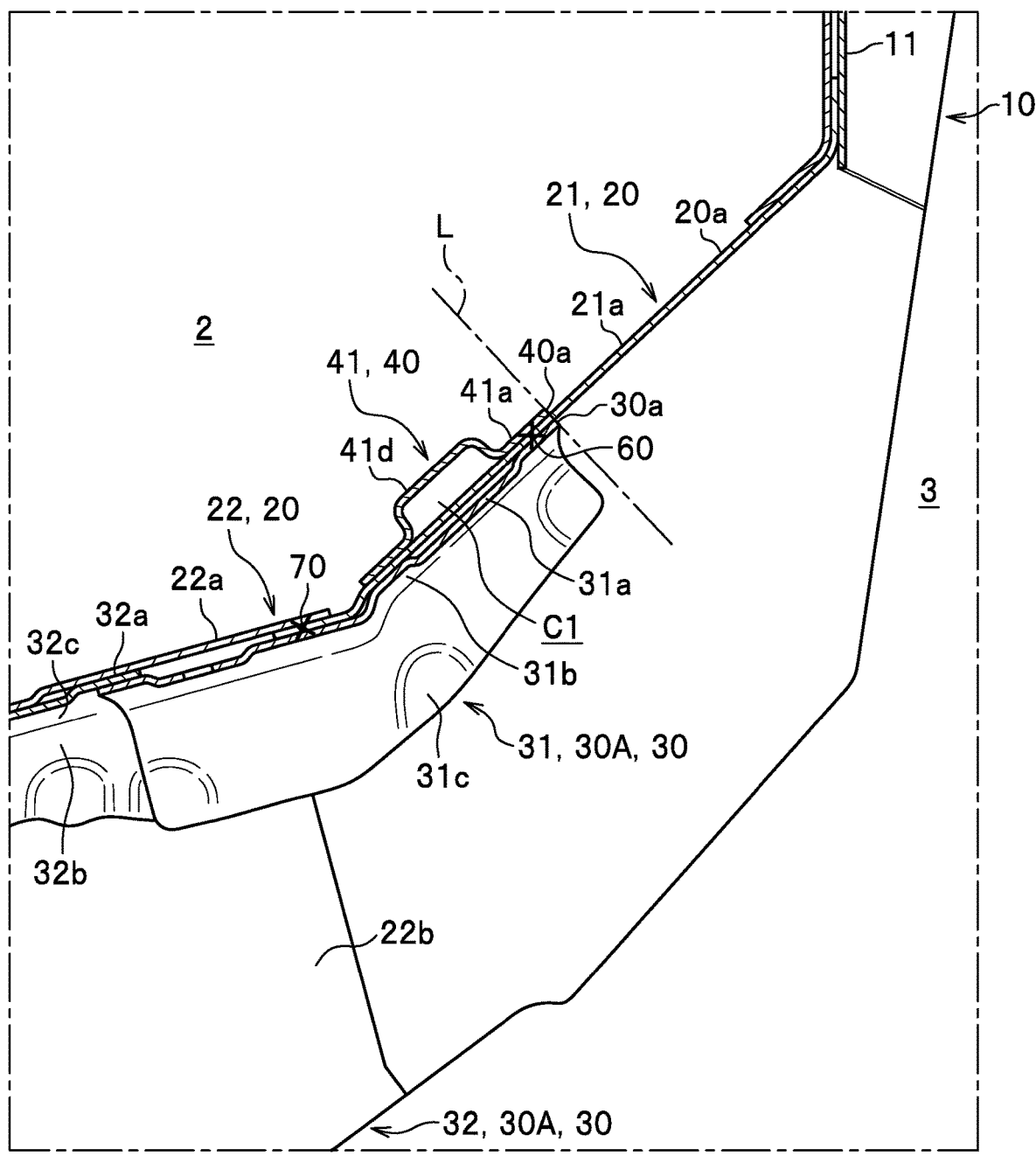
FIG. 5 is a vertical cross sectional view on V-V arrow in FIG. 4.

As illustrated in FIG. 5, a rear end of the front floor tunnel 21 and a front end of the rear floor tunnel 22 are laid on top of each other and are joined together by welding or the like. In this way, a second joint 70 is formed at which the front floor tunnel 21 and the rear floor tunnel 22 are joined together. The second joint 70 is provided in the rear of a front end 40a of the dash cross member 40. To put it the other way around, the front end 40a of the dash cross member 40 is located in front of the second joint 70. More specifically, the entire dash cross member 40 (center cross member 41) is provided in front of the second joint 70. Note that the second joint 70 may be provided at a position corresponding to the dash cross member 40 in the front-rear direction (for example, a position corresponding to the front end, a closed cross section, a rear end, or the like of the dash cross member 40).

Figure 3:
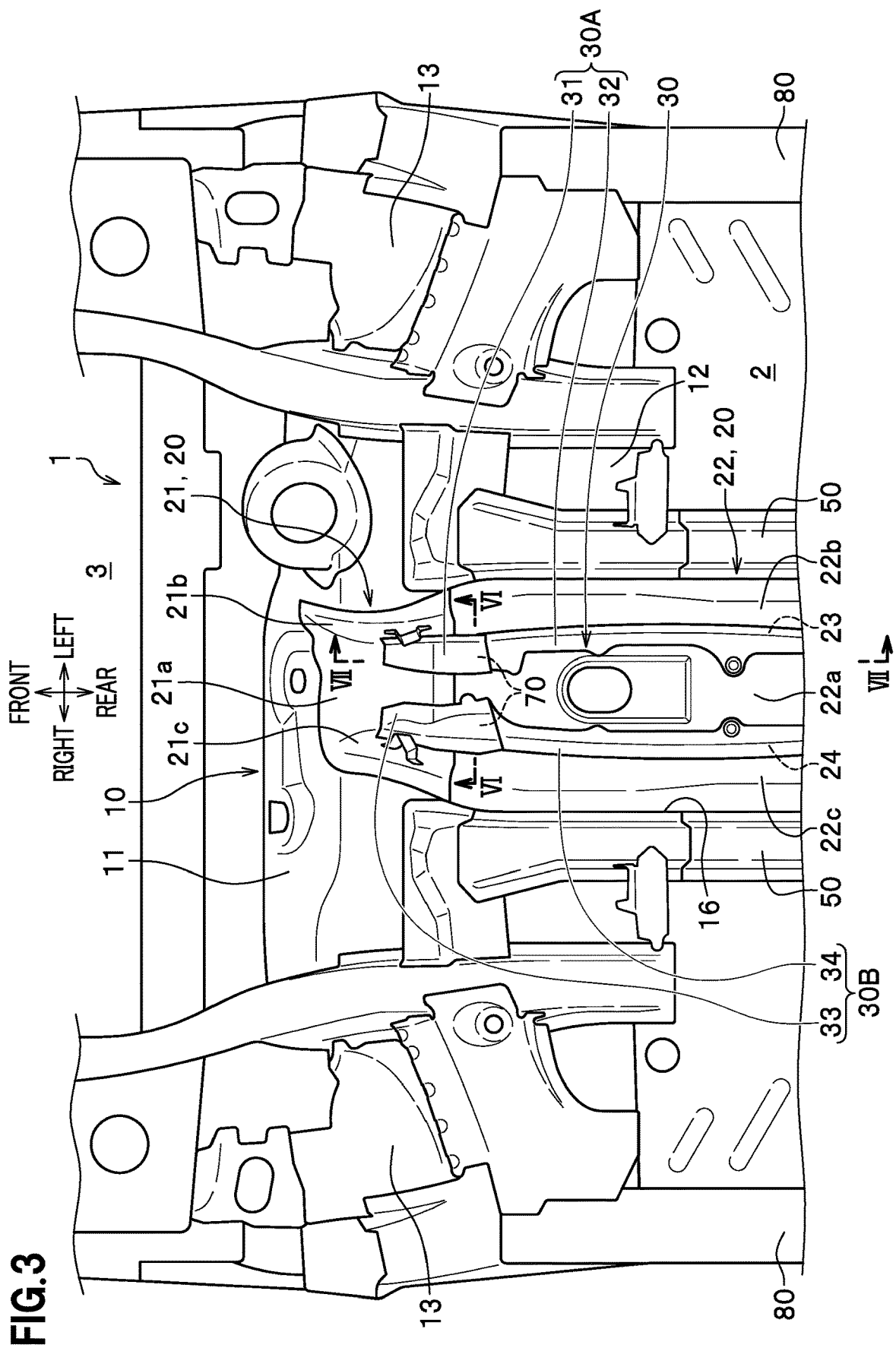
FIG. 3 is a bottom side view of the vehicle body structure seen upward from the lower side.

As illustrated in FIG. 3, the corner patches 30 are members extending in the front-rear direction along the left and right ridge portions 23, 24 of the floor tunnel 20 on a side of the floor tunnel 20 opposite from the vehicle interior 2 (vehicle exterior side). The corner patches 30 include a left corner patch 30A extending along the tunnel left ridge portion 23 and a right corner patch 30B extending along the tunnel right ridge portion 24. The corner patches 30A, 30B are each formed by, for example, bending a steel plate into a predetermined shape by press molding. In the following description, a face of the floor tunnel 20 on the opposite side from the vehicle interior 2 is referred to as a "back face" in some cases.

The left corner patch 30A is divided into a left front corner patch 31 and a left rear corner patch 32.

The left front corner patch 31 is provided to range from the front floor tunnel 21 to the rear floor tunnel 22. The left front corner patch 31 extends beyond the second joint 70, which is a point where the front floor tunnel 21 and the rear floor tunnel 22 are joined together, such that a front end of the left front corner patch 31 reaches a position near a middle portion of the front floor tunnel 21 in the front-rear direction. Note that, the left front corner patch 31 is also joined to the front floor tunnel 21 and the rear floor tunnel 22 at the second joint 70 (the joint of three plates).

Figure 6:
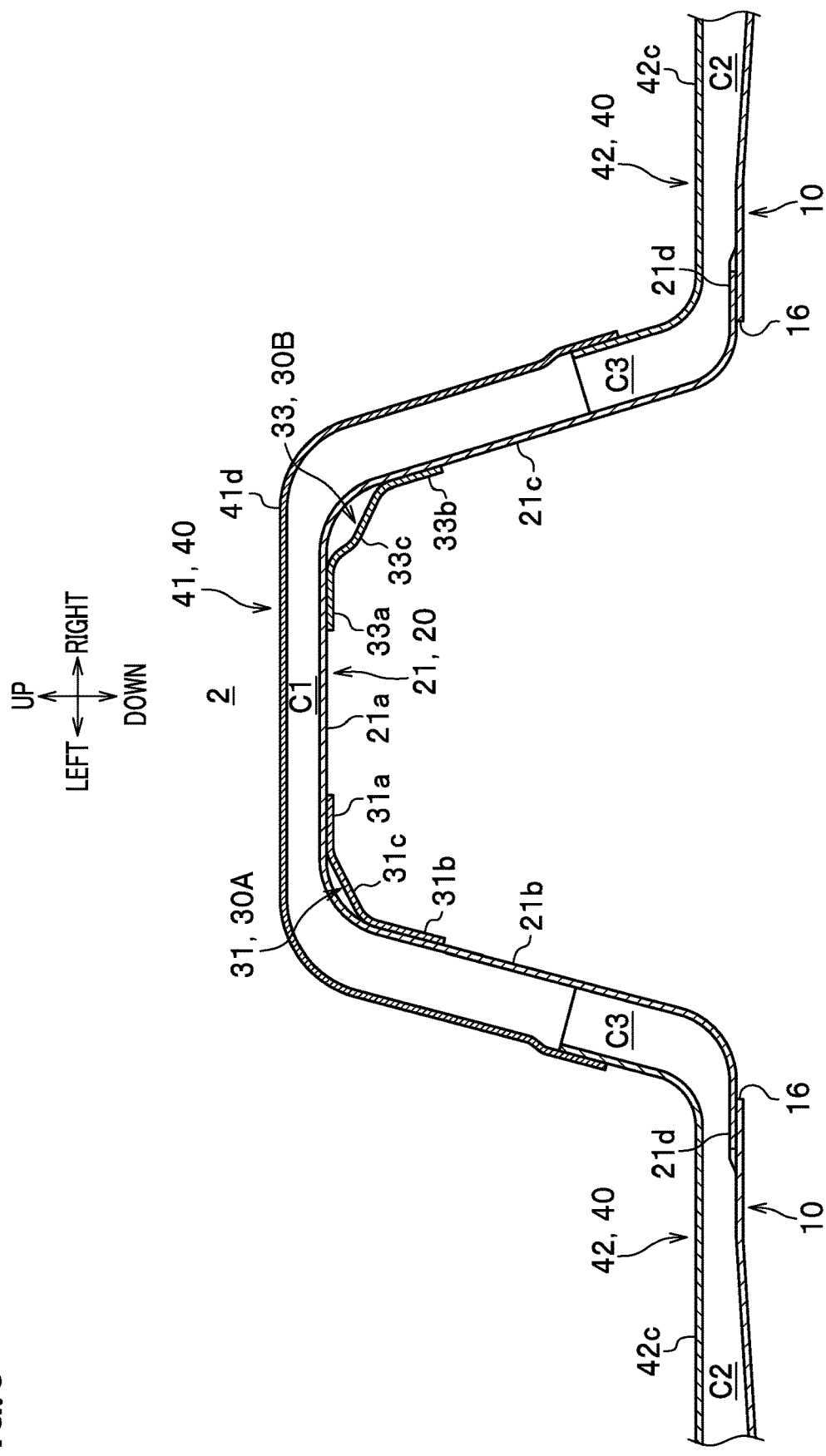
FIG. 6 is a vertical cross sectional view on VI-VI arrow in FIG. 3.

The left front corner patch 31 illustrated in FIG. 6 includes a left front patch upper wall portion 31a constituting an upper wall, a left front patch side wall portion 31b constituting a side wall, and a left front patch coupling portion 31c coupling a vehicle-widthwise outer end of the left front patch upper wall portion 31a to an upper end of the left front patch side wall portion 31b. The left front patch upper wall portion 31a is joined by welding or the like to the back faces of the front tunnel upper wall portion 21a and the rear tunnel upper wall portion 22a (see FIG. 3). The left front patch side wall portion 31b is joined by welding or the like to the back faces of the front tunnel left wall portion 21b and the rear tunnel left wall portion 22b (see FIG. 3). The left front patch coupling portion 31c extends obliquely between the left front patch upper wall portion 31a and the left front patch side wall portion 31b, and is located away from the back face of the floor tunnel 20.

As illustrated in FIG. 5, the left rear corner patch 32 is arranged in the rear of the left front corner patch 31. A front end of the left rear corner patch 32 and a rear end of the left front corner patch 31 are laid on top of each other and are joined together by welding or the like. The left rear corner patch 32 has substantially the same structure as the left front corner patch 31, and includes a left rear patch upper wall portion 32a constituting an upper wall, a left rear patch side wall portion 32b constituting a side wall, and a left rear patch coupling portion 32c coupling a vehicle-widthwise outer end of the left rear patch upper wall portion 32a to an upper end of the left rear patch side wall portion 32b. The left rear patch upper wall portion 32a is joined to the back face of the rear tunnel upper wall portion 22a by welding or the like. The left rear patch side wall portion 32b is joined to the back face of the rear tunnel left wall portion 22b by welding or the like.

As illustrated in FIG. 3, the right corner patch 30B is divided into a right front corner patch 33 and a right rear corner patch 34 in the front-rear direction.

The right front corner patch 33 is provided to range from the front floor tunnel 21 to the rear floor tunnel 22. The right front corner patch 33 extends beyond the second joint 70, which is a point where the front floor tunnel 21 and the rear floor tunnel 22 are joined together, such that a front end of the right front corner patch 33 reaches a position near a middle portion of the front floor tunnel 21 in the front-rear direction. Note that, the right front corner patch 33 is also joined to the front floor tunnel 21 and the rear floor tunnel 22 at the second joint 70 (the joint of three plates).

The right front corner patch 33 illustrated in FIG. 6 includes a right front patch upper wall portion 33a constituting an upper wall, a right front patch side wall portion 33b constituting a side wall, and a right front patch coupling portion 33c coupling a vehicle-widthwise outer end of the right front patch upper wall portion 33a to an upper end of the right front patch side wall portion 33b. The right front patch upper wall portion 33a is joined by welding or the like to the back faces of the front tunnel upper wall portion 21a and the rear tunnel upper wall portion 22a (see FIG. 3). The right front patch side wall portion 33b is joined by welding or the like to the back faces of the front tunnel right wall portion 21c and the rear tunnel right wall portion 22c (see FIG. 3). The right front patch coupling portion 33c extends obliquely between the right front patch upper wall portion 33a and the right front patch side wall portion 33b, and is located away from the back face of the floor tunnel 20.

As illustrated in FIG. 3, the right rear corner patch 34 is arranged in the rear of the right front corner patch 33. A front end of the right rear corner patch 34 and a rear end of the right front corner patch 33 are laid on top of each other and are joined together by welding or the like. The right rear corner patch 34 has substantially the same structure as the right front corner patch 33, and includes a right rear patch upper wall portion constituting an upper wall, a right rear patch side wall portion constituting a side wall, and a right rear patch coupling portion coupling a vehicle-widthwise outer end of the right rear patch upper wall portion to an upper end of the right rear patch side wall portion, although their illustrations are omitted herein. The right rear patch upper wall portion is joined to the back face of the rear tunnel upper wall portion 22a by welding or the like. The right rear patch side wall portion is joined to the back face of the rear tunnel right wall portion 22c by welding or the like.

Figure 7:
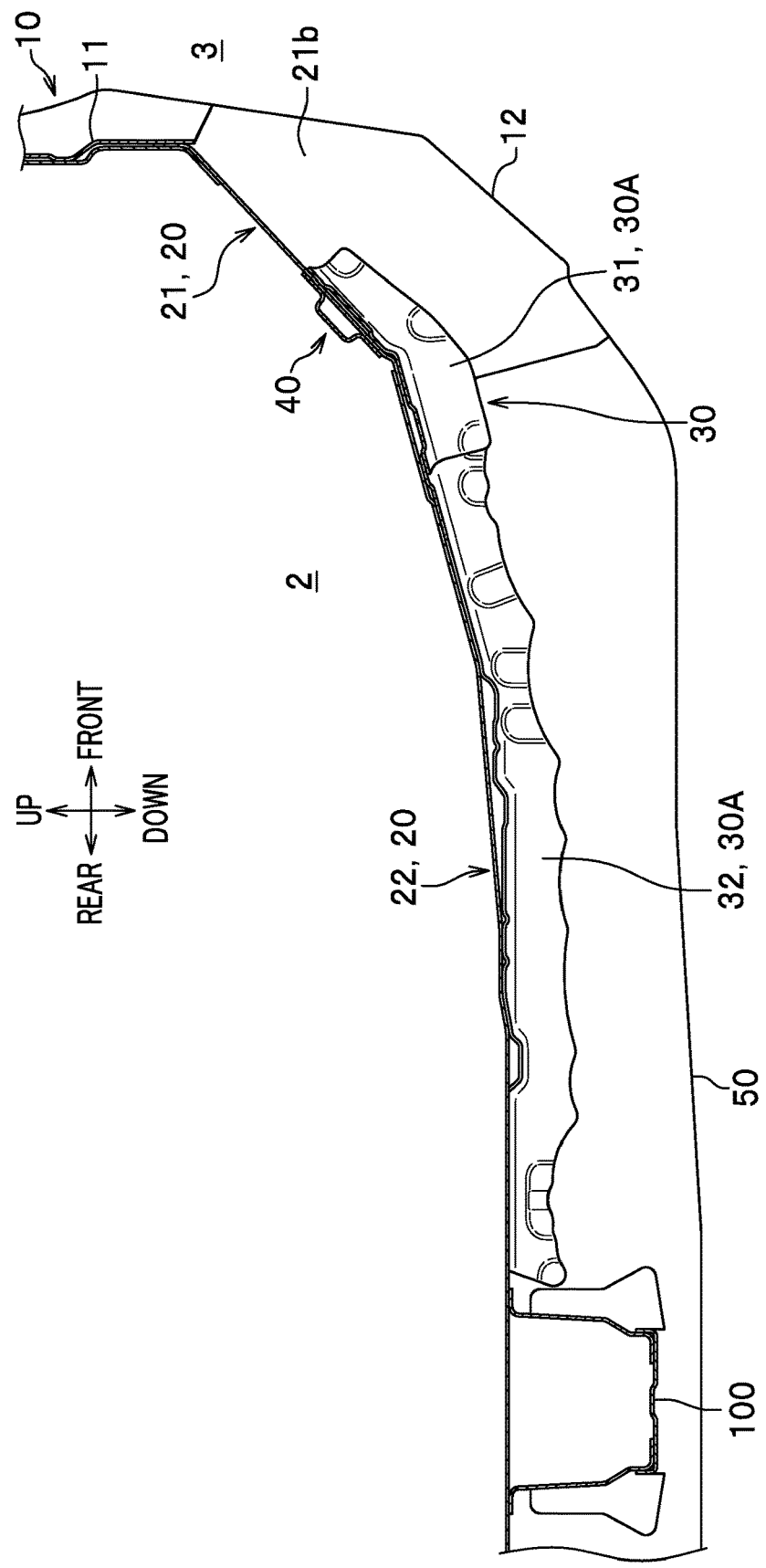
FIG. 7 is a vertical cross sectional view on VII-VII arrow in FIG. 3.

As illustrated in FIG. 7, the left front corner patch 31 extends along a position corresponding to the inclined wall 12. The left rear corner patch 32 extends from a position corresponding to the inclined wall 12 to a position corresponding to the floor panel 50 serving as the front-rear wall. In other words, the left corner patch 30A extends continuously from a position corresponding to the inclined wall 12 to the position corresponding to the floor panel 50. A rear end of the left corner patch 30A reaches a position near a front seat supporting cross member 100 extending in the vehicle width direction. Although their illustrations are omitted, similarly, the right front corner patch 33 also extends along a position corresponding to the inclined wall 12, whereas the right rear corner patch 34 also extends from a position corresponding to the inclined wall 12 to a position corresponding to the floor panel 50. In other words, the right corner patch 30B also extends continuously from a position corresponding to the inclined wall 12 to the position corresponding to the floor panel 50. A rear end of the right corner patch 30B also reaches a position near the front seat supporting cross member 100.

Figure 8:
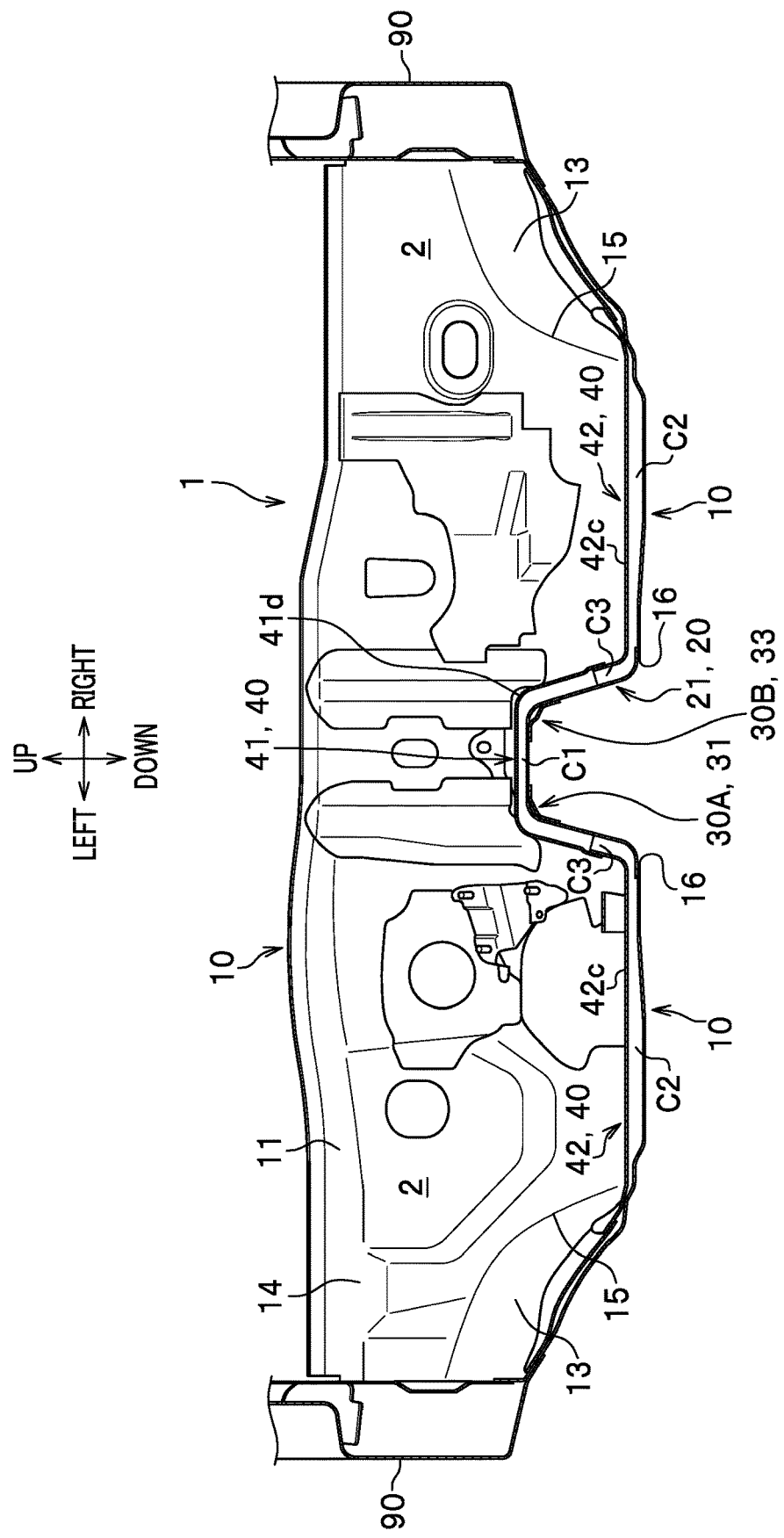
FIG. 8 is a vertical cross sectional view on VIII-VIII arrow in FIG. 2.

As illustrated in FIGS. 2 and 8, the dash cross member 40 is a framework member provided to the dash lower panel 10 and the floor tunnel 20, and constituting a closed cross section extending in the vehicle width direction. The dash cross member 40 includes a center cross member 41 and a pair of left and right side cross members 42, 42. In other words, the dash cross member 40 is formed of the center cross member 41 and the side cross members 42, 42 which are coupled to each other in the vehicle width direction.

The center cross member 41 is a member that forms a closed cross section in collaboration with the front floor tunnel 21. The center cross member 41 is joined to a face of the front floor tunnel 21 on the vehicle interior 2 side. The center cross member 41 is joined to a rear side portion of the front floor tunnel 21. The center cross member 41 is formed by, for example, bending a steel plate into an inverted-U shape by press molding. The center cross member 41 illustrated in FIG. 4 includes a center upper wall portion 41a joined to a face of the front tunnel upper wall portion 21a on the vehicle interior 2 side, a center left wall portion 41b joined to a face of the front tunnel left wall portion 21b on the vehicle interior 2 side, a center right wall portion 41c joined to a face of the front tunnel right wall portion 21c on the vehicle interior 2 side, and a center bead forming portion 41d having a protruding face on the vehicle interior 2 side and a recessed face on the opposite side from the vehicle interior 2 (the face on the front floor tunnel 21 side).

The center bead forming portion 41d is formed to be continuous over the entire vehicle-widthwise length of the center portion of the center cross member 41 in the front-rear direction. The center bead forming portion 41d forms a closed cross section C1 (see FIG. 6) by keeping away from the face of the front floor tunnel 21 on the vehicle interior 2 side when the center cross member 41 is joined to the front floor tunnel 21. The closed cross section C1 continues in the vehicle width direction from the front tunnel left wall portion 21b through the front tunnel upper wall portion 21a to the front tunnel right wall portion 21c.

The side cross members 42, 42 illustrated in FIG. 4 are members that form closed cross sections in collaboration mainly with the dash lower panel 10. The side cross members 42, 42 are joined to a face of the dash lower panel 10 on the vehicle interior 2 side, on both vehicle-widthwise sides of the floor tunnel 20. Each side cross member 42 is formed by, for example, bending a steel plate into an L-shape by press molding. The side cross member 42 includes a side transverse wall portion 42a extending in the front-rear direction and in the vehicle width direction, a side flange portion 42b extending on the vehicle interior 2 side from a vehicle-widthwise inner end of the side transverse wall portion 42a (on the floor tunnel 20 side) along the side wall of the floor tunnel 20, and a side bead forming portion 42c having a protruding face on the vehicle interior 2 side and a recessed face on the opposite side from the vehicle interior 2 (the face on the dash lower panel 10 side).

The side bead forming portion 42c is formed to be continuous over the entire vehicle-widthwise length of the center portion of the side cross member 42 in the front-rear direction. The side bead forming portions 42c form closed cross sections C2 (see FIG. 6) by keeping away from the face of the dash lower panel 10 on the vehicle interior 2 side when the side cross members 42 are joined to the dash lower panel 10. The closed cross sections C2 extend in the vehicle width direction on both vehicle-widthwise sides of the floor tunnel 20.

The side transverse wall portion 42a is joined by welding or the like to the inclined wall 12 of the dash lower panel 10 on both front and rear sides of the side bead forming portion 42c. The side flange portion 42b is joined to the side wall of the front floor tunnel 21 by welding or the like. The side bead forming portions 42c of the side cross members 42 form closed cross sections C3 (see FIG. 6) by keeping away from the face of the front floor tunnel 21 on the vehicle interior 2 side when the side cross members 42 are joined to the front floor tunnel 21. In other words, the side cross members 42 also form the closed cross sections in collaboration with the front floor tunnel 21 in the present embodiment. Here, the dash cross member 40 may have a structure where the side cross members 42 with the side flange portions 42b omitted therefrom do not form the closed cross sections in collaboration with the front floor tunnel 21, but the center cross member 41 extends further outward in the vehicle width direction to form closed cross sections in collaboration with the dash lower panel 10.

As illustrated in FIGS. 2 and 8, the center cross member 41 is joined to the face of the front floor tunnel 21 on the vehicle interior 2 side. Meanwhile, the side cross member 42 is joined to the face of the dash lower panel 10 on the vehicle interior 2 side. A vehicle-widthwise outer end of the center cross member 41 and a vehicle-widthwise inner end of the side cross member 42 are laid on top of each other and are joined together by welding or the like. A vehicle-widthwise outer end of the side cross member 42 reaches a position near the vehicle-widthwise inner end of the wheel arch forming portion 13 (ridge portion 15). In this way, the dash cross member 40 is provided on the vehicle interior 2 side of the floor tunnel 20 to range continuously from the floor tunnel 20 to both vehicle-widthwise sides. In other words, the dash cross member 40 extends on the vehicle interior 2 side continuously in the vehicle width direction while transversely crossing the floor tunnel 20. The closed cross section C1 formed by the center cross member 41 is continued to the closed cross sections C2, C3 formed by the side cross members 42. In other words, one closed cross section extending continuously in the vehicle width direction is formed by the closed cross section C1 and the closed cross sections C2, C3.

Here, with reference to FIG. 5, the front end 40a of the dash cross member 40 and its surrounding structure are described in more details. In front of the center bead forming portion 41d, the center upper wall portion 41a of the center cross member 41 is joined, with the front tunnel upper wall portion 21a interposed in between, to the left front patch upper wall portion 31a (the joint of three plates) and also to the right front patch upper wall portion 33a (not illustrated) (the joint of three plates). In this way, first joints 60 are formed at which the front ends of the dash cross member 40 and the corner patches 30 are joined together. The first joints 60 are located in the rear of the front end 40a of the dash cross member 40 and the front ends 30a of the corner patches 30.

Reference sign L illustrated in FIG. 5 indicates a reference line extending in a direction perpendicular to the extending direction of the dash cross member 40 and passing through the front end 40a of the dash cross member 40. The front ends 30a of the corner patches 30 may be arranged at the same position as the reference line L as illustrated in FIG. 5, or be arranged in the rear of the reference line L (or the front end 40a of the dash cross member 40). The floor tunnel 20 includes a front extension portion 20a extending frontward beyond the front end 40a of the dash cross member 40. The front extension portion 20a extends frontward beyond the first joints 60. The front extension portion 20a is formed over an area surrounded by the front tunnel upper wall portion 21a, the front tunnel left wall portion 21b, the front tunnel right wall portion 21c, and the front tunnel flange portion 21d (see FIG. 4).

The vehicle body structure 1 according to the present embodiment is configured basically as described above. Next, the operation and effects of the vehicle body structure 1 are described.

In the present embodiment, as illustrated in FIGS. 2 and 8, the dash cross member 40 is provided on the vehicle interior 2 side to range continuously from the floor tunnel 20 to both vehicle-widthwise sides, and therefore is capable of forming the closed cross section continuous across the floor tunnel 20. This makes it possible to ensure the continuity of the closed cross section formed by the dash cross member 40, and thereby to enhance the stiffness of the closed cross section of the dash cross member 40.

Moreover, as illustrated in FIG. 5, the front ends of the dash cross member 40 arranged on the vehicle interior 2 side of the floor tunnel 20 and the corner patches 30 provided on the vehicle exterior side (the opposite side from the vehicle interior 2) of the floor tunnel 20 are joined together at the first joints 60. This structure is capable of inhibiting a portion of the dash cross member 40 around the floor tunnel 20 from moving rearward upon front end collision, and therefore inhibiting deformation of a leg space in the vehicle interior 2.

In addition, as illustrated in FIG. 5, the floor tunnel 20 includes the front extension portion 20a extending frontward beyond the first joints 60 having high stiffness. This structure is capable of absorbing the collision energy by actively collapsing the front extension portion 20a upon front end collision.

Further, in the present embodiment, as illustrated in FIG. 5, the front extension portion 20a extends frontward beyond the front end 40a of the dash cross member 40, and the front end 30a of the corner patch 30 is arranged at the same position as the front end 40a of the dash cross member 40. Since the corner patch 30 does not hinder the front extension portion 20a in deformation, this structure is capable of absorbing the collision energy by collapsing the front extension portion 20a more stably.

Additionally, in the present embodiment, as illustrated in FIG. 1, the floor tunnel 20 extends continuously from the vertical wall 11 through the inclined walls 12 to the floor panel 50 serving as the front-rear wall, whereas the corner patches 30 extend continuously from the positions corresponding to the inclined walls 12 to the positions corresponding to the floor panel 50. In this structure, the corner patches 30 can prevent the floor tunnel 20 from bending rearward at a position near the corner (boundary) between the inclined wall 12 and the floor panel 50 upon input of a collision load to the front extension portion 20a. Thus, the front extension portion 20a can be collapsed efficiently.

Still further, in the present embodiment, as illustrated in FIG. 5, the second joint 70 is provided in the rear of the front end 40a of the dash cross member 40. Since the front end 40a of the dash cross member 40 is located in front of the second joint 70 having high stiffness, this structure is capable of inhibiting the dash cross member 40 from moving rearward upon front end collision. Then, since the front floor tunnel 21 located in front of the rear floor tunnel 22 can be collapsed preferentially, this structure is capable of absorbing the collision energy more stably.

Moreover, in the present embodiment, as illustrated in FIG. 3, each of the corner patches 30 is provided on both the front floor tunnel 21 and the rear floor tunnel 22. This structure is capable of preventing relative displacement of the front floor tunnel 21 and the rear floor tunnel 22, and therefore collapsing the front floor tunnel 21 more stably.

In addition, in the present embodiment, the front floor tunnel 21 is formed to have a lower compressive strength to a load from front than the rear floor tunnel 22. Thus, the front floor tunnel 21 is more easily deformed than the rear floor tunnel 22. This makes it possible to collapse the front floor tunnel 21 more stably.

Further, in the present embodiment, the floor tunnel 20 is formed to have a lower strength to a load from front than the dash lower panel 10 serving as the front wall section. Since the floor tunnel 20 is more easily deformed than the dash lower panel 10, this structure is capable of hindering the dash lower panel 10 in deformation and consequently keeping the leg space in the vehicle interior 2 upon front end collision.

Still further, in the present embodiment, as illustrated in FIGS. 2 and 8, the dash cross member 40 is divided into the center cross member 41 and the side cross members 42, 42 in the vehicle width direction, and is arranged on the vehicle interior 2 sides of the dash lower panel 10 and the floor tunnel 20. Thus, in assembling work, the top faces of the center bead forming portion 41d and the side bead forming portions 42c may be joined together in advance at places where the end portions of the center cross member 41 overlap with the end portions of the side cross members 42. In this way, the strength of the dash cross member 40 can be preferably enhanced even in the case where the dash cross member 40 is designed to have a divided structure.

Hereinabove, the vehicle body structure 1 according to the present embodiment is described in details with reference to the drawings. However, the present invention is not limited to the above embodiment, and may be altered as appropriate without departing from the spirit of the present invention.

For example, the dash cross member 40 has the divided structure, but may be composed of a single member. Then, the vehicle-widthwise outer end of the side cross member 42 reaches the position near the vehicle-widthwise inner end of the wheel arch forming portion 13 (ridge portion 15) in the present embodiment, but may reach the front pillar lower 90. Moreover, the left corner patch 30A has the divided structure in the present embodiment, but may be composed of a single patch. Still further, the right corner patch 30B has the divided structure in the present embodiment, but may be composed of a single patch.

What is claimed is:

1. A vehicle body structure comprising:
a dash cross member provided on a front wall section of a vehicle interior, and forming a closed cross section extending in a vehicle width direction:
a floor tunnel provided on a vehicle-widthwise center section of the vehicle interior, formed in a groove shape opened to a lower side, and extending in a front-rear direction;
a corner patch provided on a vehicle exterior side of the floor tunnel and extending along a ridge portion of the floor tunnel in the front-rear direction; and
a first joint at which front end sides of the dash cross member and the corner patch are joined together, wherein
the dash cross member is provided on the vehicle interior side of the floor tunnel so as to range continuously from the floor tunnel to both vehicle-widthwise sides, and
the floor tunnel includes a front extension portion extending frontward beyond the first joint.

2. The vehicle body structure according to claim 1, wherein
the front extension portion extends frontward beyond a front end of the dash cross member, and
a front end of the corner patch is arranged at the same position as the front end of the dash cross member or in the rear of the front end of the dash cross member.

3. The vehicle body structure according to claim 1, wherein
the front wall section of the vehicle interior includes a vertical wall extending in a vertical direction, and an inclined wall extending from a lower end of the vertical wall while inclining downward toward the rear, the vehicle interior includes a front-rear wall extending rearward from a lower end of the inclined wall, the floor tunnel extends continuously from the vertical wall through the inclined wall to the front-rear wall, and the corner patch extends continuously from a position corresponding to the inclined wall to a position corresponding to the front-rear wall.

4. The vehicle body structure according to 1, wherein the floor tunnel includes
   a front floor tunnel,
   a rear floor tunnel arranged in the rear of the front floor tunnel, and
   a second joint at which the front floor tunnel and the rear floor tunnel are joined together, and
the second joint is provided in the rear of a front end of the dash cross member.

5. The vehicle body structure according to claim 4, wherein
   the corner patch is provided to range from the front floor tunnel to the rear floor tunnel.

6. The vehicle body structure according to claim 4, wherein
   the front floor tunnel is formed to have a lower compressive strength to a load from front than the rear floor tunnel.

7. The vehicle body structure according to claim 1, wherein
   the front wall section of the vehicle interior and the floor tunnel are separate members, and
   the floor tunnel is formed to have a lower compressive strength to a load from front than the front wall section of the vehicle interior.

* * * * *